3,317,531
DERIVATIVES OF PYRIDAZONIMINES AND A METHOD FOR THEIR PREPARATION
Franz Reicheneder and Karl Dury, Ludwigshafen (Rhine), Germany, assignors to Badische Anilin- & Soda-Fabrik Aktiengesellschaft, Ludwigshafen (Rhine), Germany
No Drawing. Filed Mar. 17, 1964, Ser. No. 352,647
Claims priority, application Germany, Mar. 19, 1963, B 71,190
12 Claims. (Cl. 260—250)

This invention relates to pyridazonimines which are not known in the art.

It is an object of this invention to provide a process for the production of pyridazonimines. Another object of this invention is the valuable and novel pyridazonimines themselves.

In accordance with this invention these objects are achieved and pyridazonimines having the formula

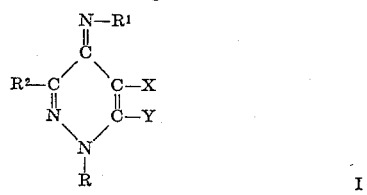

I in which R denotes an aliphatic or aromatic radical, $R^1$ denotes an aliphatic or araliphatic radical, $R^2$ denotes hydrogen, halogen or an aromatic radical, X denotes hydrogen or halogen and Y denotes chlorine or bromine are obtained when a 4-amino-pyridazone-(6) having the general formula:

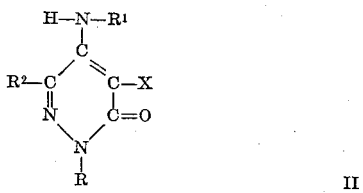

II in which R, $R^1$, $R^2$ and X have the above meanings is reacted with an acid bromide or acid chloride and the pyridazonimine is set free by a conventional method from the pyridazonimine hydrochloride or hydrobromide formed.

In the preferred initial materials having the Formula II, R denotes an alkyl group, preferably having one to four carbon atoms, or phenyl, $R^1$ denotes hydrogen, an alkyl group, preferably with one to six carbon atoms or an aralkyl group, preferably with seven to nine carbon atoms, $R^2$ denotes hydrogen, preferably having six to ten carbon atoms, an aryl group, chlorine or bromine, and X denotes hydrogen, chlorine or bromine. In the preferred compounds, the radicals R, $R^1$ and $R^2$ of the formulae may bear as substituents one or two hydroxyl groups, nitro groups, alkoxy groups having one to four carbon atoms, sulfonic acid groups, bromine atoms or chlorine atoms. Hydroxyl groups are halogenated at the same time by the acid halide. The initial materials may be prepared in a very simple way, for example by the process described in abandoned U.S. patent application Ser. No. 854,276, filed Nov. 20, 1959, by Franz Reicheneder, Karl Dury and Adolf Fischer.

Examples of initial materials which may be used are: 1-phenyl-4-amino-5 - chloropyridazone-(6), 1-(p-chlorophenyl)-4-benzylamino-5-bromopyridazone-(6), 1-(2',4'-dibromophenyl)-4-butylamino-5 - bromopyridazone-(6), 1-phenyl-4-methylamino-5-chloropyridazone-(6), 1-butyl-3-chloro-4-naphthylamino-5-chloropyridazone-(6), 1-(m-bromophenyl)-4-p-methoxyphenyl - 5-chloropyridazone-(6), 1-phenyl-4-ethylamino - 5-chloropyridazone-(6), 1-phenyl-4-β-hydroxy - ethylamino-5-bromopyridazone-(6), 1-phenyl-4-amino-5-bromopyridazone-(6), and 1-methyl-3-phenyl-4-methylaminopyridazone-(6).

Examples of acid bromides and acid chlorides which may be used are: the chlorides or bromides of trivalent or pentavalent phosphorus or of tetravalent or hexavalent sulfur, e.g. phosphorus oxychloride, phosphorous tribromide, phosphorus pentachloride, thionyl chloride or sulfuryl chloride. Tertiary amines, such as triethylamine, dimethylaniline, diethylaniline or pyridine, and also carboxylic amides, such as dimethyl formamide and N-methylpyrrolidone, or tetra-substituted ureas, such as tetramethylurea, may also be added to the reaction mixture. To carry out the reaction, the initial materials may be allowed to act on one another in stoichiometric amounts. It is advantageous to use an excess of the halogenating agent and of any tertiary amine or amide, for example twice to ten times a stoichiometrical excess. This is particularly expedient when the initial pyridazones have poor solubility, and the halogenating agent and any tertiary amine or amide used may then act as a solvent. The reaction may be carried out in the presence of inert diluents, such as hydrocarbons, for example benzene or toluene, chlorohydrocarbons, such as chlorobenzene, methylene chloride, chloroform or carbon tetrachloride, or nitrobenzene. The temperatures used are as a rule from about 0° to about 150° C. advantageously from about 30° to about 110° C. When the reaction is over, it is advantageous to separate the bulk of the excess halogenating agent present from the reaction mixture by distillation. Then ice is added to the reaction mixture, if desired after dilution of the reaction mixture with chloroform or carbon tetrachloride. After the whole has stood for some time, crystals separate out, from which the pyridazonimine may be liberated at temperatures of from —20° to 20° C. by the addition of bases, for example dilute aqueous alkalies such as sodium hydroxide, sodium bicarbonate, sodium carbonate, or potassium carbonate. If the dilute aqueous alkalies are allowed to act at elevated temperature, for example from 25° to 70° C., the initial pyridazones are reformed by saponification of the halogen atom which has entered into the 6-position.

The pyridazonimines obtainable by the process are new substances. They are valuable intermediates for the production of insecticides and plant protection agents. Thus for example a substance exhibiting repellent action is obtained by reacting 1-phenyl-5,6-dichloropyridazone-4-imine with morpholine. By virtue of their weakly basic properties, they may also be used as stabilisers for polyvinyl chloride. They also act as herbicides against dicotyledons in cereal crops. They may be used for pre-emergence treatment in amounts of 0.5 to 5 kg. per hectare.

The invention is further illustrated by the following examples in which the parts are by weight unless stated otherwise. Parts by volume bear the same relation to parts by weight as the litre (S.T.P.) to the kilogram.

*Example 1*

22 parts of 1-phenyl-4-amino-5-chloropyridazone-(6) is slowly introduced with good stirring into 300 parts by volume of phosphorus oxychloride and the mixture is heated to about 60° C. until a clear solution has been formed. Then 42 parts of phosphorus pentachloride is added slowly to the reaction mixture. Crystals begin to separate after about five minutes. The whole is kept at this temperature for a total of thirty minutes. The bulk of the excess phosphorus oxychloride is then distilled off. The residue is taken up with chloroform and poured onto ice. After standing overnight in an icebox, 30 parts of a white crystalline product has separated out. This is recrystallized from water. The melting point is 223° to 224° C., dark coloration taking place from 210° C. By grinding the product with aqueous sodium bicarbonate solution, 1-phenyl-5,6-dichloropyridazone-4-imine is obtained as white crystals which become slightly yellow in color in the air. After the base has been recrystallized from methanol and benzene, it melts at 145° to 146° C.

*Analysis.*—$C_{10}H_7N_3Cl_2$. Calculated: C, 50.0%; H, 2.91%; N, 17.5%; Cl, 29.6%. Found: C, 49.7%; H, 3.5%; N, 17.1%; Cl, 29.2%.

Example 2

20 parts of 1-phenyl-4-methylamino-5-chloropyridazone-(6) is introduced into 150 parts by volume of phosphorus oxychloride with good stirring and heating to 80° C. Then 21 parts of phosphorus pentachloride is added to the solution. It is heated further to 100° C. and kept at this temperature for two hours. The excess phosphorus oxychloride is distilled off and the residue is taken up in chloroform and poured onto ice. 15 parts of a crude crystalline product thus separates. After having been filtered off, it is dissolved in water and made weakly alkaline with about 1 N caustic soda solution. 1-phenyl-5,6-dichloropyridazone-4-methylimine thus separates in the form of crystals which are filtered off, dried and recrystallized from cyclohexane. The melting point is 155° to 156° C.

*Analysis.*—$C_{11}H_9N_3Cl_2$. Calculated: C, 52.1%; H, 3.54%; N, 16.55%; Cl, 27.9%. Found: C, 52.2%; H, 3.3%; N, 17.1%; Cl, 27.6%.

Analysis of 1-phenyl-5,6-dichloropyridazone-4-methylimine hydrochloride: $C_{11}H_9N_3Cl_2 \cdot HCl$. Calculated: C, 45.4% H, 3.44%; N, 14.45%; Cl, 36.7%. Found: C, 45.4%; H, 2.9%; N, 15.4%; Cl, 36.0%.

Example 3

25 parts of 1-phenyl-4-ethylamino-5-chloropyridazone-(6) is introduced at 70° C. into 250 parts by volume of phosphorus oxychloride. Then 42 parts of phosphorus pentachloride is added at 70° C. and the whole further worked up as described in Example 1. 10 parts of 1-phenyl-5,6-dichloropyridazone-4-ethylimine is obtained. After having been recrystallized from cyclohexane, it melts at 146° to 147° C.

*Analysis.*—$C_{12}H_{11}N_3Cl_2$. Calculated: C, 53.7%; H, 4.1%; N, 15.65%; Cl, 26.5%. Found: C, 53.8%; H, 4.5%; N, 14.8%; Cl, 26.3%.

Example 4

27 parts of 1-phenyl-4-(β-hydroxyethylamino)-5-chloropyridazone-(6) is introduced at about 50° C. into 200 parts by volume of phosphorus oxychloride while stirring. 42 parts of phosphorus pentachloride is then added to the reaction mixture. Further working up is carried out as described in Example 1. 20 parts of 1-phenyl-5,6- dichloropyridazone - 4-(β-chloroethyl)-imine hydrochloride is obtained.

*Analysis.*—$C_{12}H_{10}N_3Cl_3 \cdot HCl$. Calculated: C, 42.5%; H, 3.25%; N, 12.4%; Cl, 41.8%. Found: C, 43.1%; H, 3.5%; N, 12.5%; Cl, 41.1%.

1 - phenyl - 5,6 - dichloropyridazone-4-(β-chloroethyl)-imine is obtained by introducing an aqueous 0.1 N solution of caustic soda into an aqueous solution of 1-phenyl-5,6 - dichloropyridazone - 4-(β-chloroethyl)-imine hydrochloride.

Example 5

11 parts of 1-methyl-3-phenyl-4-methylaminopyridazone-(6) is introduced at 60° C. into 150 parts by volume of phosphorus oxychloride. Then 21 parts of phosphorus pentachloride is added to the solution and the whole is kept at 90° C. for one hour. After working up in the way described in Example 1, 9.5 parts of 1-methyl-3-phenyl - 6 - chloropyridazone - 4-methylimine is obtained which, after having been recrystallized from cyclohexane, melts at from 78° to 80° C.

*Analysis.*—$C_{12}H_{12}N_3Cl$. Calculated: C, 61.7%; H, 5.15%; N, 18.0%; Cl, 15.25%. Found: C, 61.6%; H, 5.4%; N, 18.3%; Cl, 15.0%.

Example 6

20 parts of triethylamine is introduced into 250 parts by volume of phosphorus oxychloride while stirring and cooling to 0° C. 24 parts of 1-phenyl-4-methylamino-5-chloropyridazone-(6) is then added. The mixture is stirred for half an hour at 90° C. The whole is worked up as described in Example 1. 17 parts of 1-phenyl-5,6-dichloropyridazone-4-methylimine is obtained. Equally good results are achieved by using diethylamine or pyridine instead of triethylamine.

Example 7

12.5 parts of 1-phenyl-4-ethylamino-5-chloropyridazone-(6) is added to 60 parts of phosphorus oxybromide and heated to 60° C. Then 30 parts of phosphorus pentachloride is added to the solution while stirring. The whole is heated to 100° C. for thirty minutes, cooled and diluted with twice its volume of chloroform. By further working up the whole according to Example 1, 9.5 parts of 1 - phenyl-5-chloro-6-bromopyridazone-4-ethylimine is obtained as the hydrobromide. It is recrystallized from methanol.

*Analysis.*—$C_{12}H_{11}N_3ClBr \cdot HBr$. Calculated: C, 36.6%; H, 3.05%; N, 10.68%; Cl, 9.02%; Br, 40.6%. Found: C, 36.2%; H, 2.8%; N, 10.1%; Cl, 9.6%; Br, 41.2%.

1-phenyl-5-chloro-6-bromopyridazone-4-ethylimine may be recovered from the hydrobromide by the method described in Example 1.

Example 8

11 parts of 1-phenyl-3-chloro-4-aminopyridazone-(6) is dissolved in 150 parts of phosphorus oxychloride and then 21 parts of phosphorus pentachloride is introduced. The whole is stirred at 95° C. for thirty minutes, cooled and worked up as described in Example 1.

11 parts of 1-phenyl-3,6-dichloropyridazone-4-imine hydrochloride is obtained. The compound may be recrystallized from alcohol and then has a melting point of 180° to 181° C.

*Analysis.*—$C_{10}H_7N_3Cl_2 \cdot HCl$. Calculated: C, 43.4%; H, 2.90%; N, 15.2%; Cl, 38.5%. Found: C, 43.2%; H, 3.0%; N, 14.6%; Cl, 38.8%.

1-phenyl-3,6-dichloropyridazone-4-imine melting at 105 to 106° C. may be obtained from the hydrochloride by the method described in Example 1.

Example 9

16 parts of 1-phenyl-4-benzylamino-5-chloropyridazone-(6) is boiled under reflux with 200 parts of phosphorus oxychloride and 42 parts of phosphorus pentachloride for two hours. The product is worked up as described in Example 1 and 15 parts of 1-phenyl-5,6-dichloropyridazone - 4 - benzylimine hydrochloride is obtained. It forms white crystals having a melting point above 260° C. when recrystallized from methanol.

*Analysis.*—$C_{17}H_{13}N_3Cl_2 \cdot HCl$. Calculated: C, 55.7%; H, 3.8%; N, 11.40%; Cl, 29.1%. Found: C, 56.6%; H, 3.4%; N, 11.0%– Cl, 28.5%.

1-phenyl-5,6-dichloropyridazone-4-benzylimine melting at 245° to 246° C. may be recovered from the hydrochloride by the method described in Example 1.

We claim:
1. A pyridazonimine having the formula

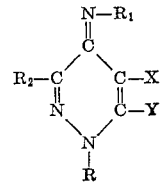

in which R denotes alkyl having 1 to 4 carbon atoms, alkyl having 1 to 4 carbon atoms and being substituted by 1 to 2 chlorine atoms, phenyl, phenyl substituted by 1 to 2 nitro groups, phenyl substituted by 1 to 2 bromine atoms and phenyl substituted by 1 to 2 chlorine atoms, $R_1$ denotes a member selected from the group consisting of hydrogen, alkyl having 1 to 6 carbon atoms, alkyl having 1 to 6 carbon atoms substituted by chlorine, alkyl having 1 to 6 carbon atoms substituted by 1 to 2 bromine atoms and aralkyl having 7 to 9 carbon atoms, $R_2$ denotes a member selected from the group consisting of hydrogen, chlorine, bromine, phenyl, phenyl substituted by 1 to 2 chlorine atoms and phenyl substituted by 1 to 2 bromine atoms, X denotes a member selected from the group consisting of hydrogen, chlorine and bromine and Y denotes a member selected from the group consisting of chlorine and bromine.

2. 1-phenyl-5,6-dichloropyridazone-4-imine.
3. 1-phenyl-5,6-dichloropyridazone-4-methylimine.
4. 1-phenyl-5,6-dichloropyridazone-4-ethylimine.
5. 1-phenyl-5,6-dichloropyridazone-4-($\beta$-chloroethyl)-imine.
6. 1 - methyl - 3 - phenyl - 6 - chloropyridazone - 4-methylimine.
7. 1 - phenyl - 5 - chloro - 6 - bromopyridazone - 4-ethylimine.
8. 1-phenyl-3,6-dichloropyridazone-4-imine.
9. 1-phenyl-5,6-dichloropyridazone-4-benzylimine.
10. A process for the production of a pyridazonimine having the formula

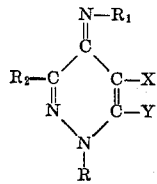

wherein R denotes alkyl having 1 to 4 carbon atoms, alkyl having 1 to 4 carbon atoms and being substituted by 1 to 2 chlorine atoms, phenyl, phenyl substituted by 1 to 2 nitro groups, phenyl substituted by 1 to 2 bromine atoms and phenyl substituted by 1 to 2 chlorine atoms, $R_1$ denotes a member selected from the group consisting of hydrogen, alkyl having 1 to 6 carbon atoms, alkyl having 1 to 6 carbon atoms substituted by chlorine, alkyl having 1 to 6 carbon atoms substituted by 1 to 2 bromine atoms and aralkyl having 7 to 9 carbon atoms, $R_2$ denotes a member selected from the group consisting of hydrogen, chlorine, bromine, phenyl, phenyl substituted by 1 to 2 chlorine atoms and phenyl substituted by 1 to 2 bromine atoms, X denotes a member selected from the group consisting of hydrogen, chlorine and bromine and Y denotes a member selected from the group consisting of chlorine and bromine, which process comprises: reacting a 4-aminopyridazone-(6) having the formula

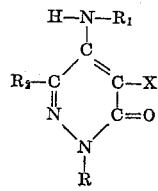

in which $R_1$, $R_2$ and X have the meanings given above, with an acid halide selected from the group consisting of the chlorides and bromides of trivalent phosphorous, pentavalent phosphorous, tetravalent sulfur and hexavalent sulfur at a temperature between about 0° C. and 150° C.; and separating the resulting pyridazonimine at a temperature of about −20° C. to +20° C. by the addition of a base.

11. A process as claimed in claim 10 carried out in the presence of an inert diluent.
12. A process as claimed in claim 10 wherein said 4-aminopyridazone-(6) is reacted with said acid halide at a temperature between about 30° C. and 110° C.

References Cited by the Examiner
UNITED STATES PATENTS
3,210,353  10/1965  Reicheneder et al. ____ 260—250

NICHOLAS S. RIZZO, *Primary Examiner.*